(12) United States Patent
Hasegawa et al.

(10) Patent No.: US 11,186,100 B2
(45) Date of Patent: Nov. 30, 2021

(54) IMAGE PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Maki Hasegawa, Kanagawa (JP); Kunio Miyakoshi, Kanagawa (JP); Masato Matsuzuki, Kanagawa (JP); Yoshiyuki Taguchi, Kanagawa (JP); Chikara Manabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 113 days.

(21) Appl. No.: 16/830,339

(22) Filed: Mar. 26, 2020

(65) Prior Publication Data

US 2021/0070070 A1 Mar. 11, 2021

(30) Foreign Application Priority Data

Sep. 11, 2019 (JP) .............................. JP2019-165543

(51) Int. Cl.
| | |
|---|---|
| *B41J 11/00* | (2006.01) |
| *B41J 11/42* | (2006.01) |
| *B41J 13/00* | (2006.01) |
| *H04N 1/60* | (2006.01) |
| *B41J 2/045* | (2006.01) |
| *B41J 2/21* | (2006.01) |
| *B41J 3/60* | (2006.01) |
| *G06F 3/12* | (2006.01) |
| *B41J 29/393* | (2006.01) |

(52) U.S. Cl.
CPC ....... *B41J 11/0095* (2013.01); *B41J 2/04573* (2013.01); *B41J 2/2135* (2013.01); *B41J 3/60* (2013.01); *B41J 11/42* (2013.01); *B41J 13/0018* (2013.01); *B41J 29/393* (2013.01); *G06F 3/1204* (2013.01); *G06F 3/1208* (2013.01); *H04N 1/6044* (2013.01); *B41J 2029/3935* (2013.01)

(58) Field of Classification Search
CPC .... B41J 29/393; B41J 2/04573; B41J 2/2135; B41J 11/42; B41J 2029/3935; G06F 3/1208; H04N 1/6044
See application file for complete search history.

(56) References Cited

U.S. PATENT DOCUMENTS

| | | | |
|---|---|---|---|
| 7,519,304 | B2 | 4/2009 | Namba |
| 2016/0063361 | A1* | 3/2016 | Hayashi ............... H04N 1/6044 399/39 |

FOREIGN PATENT DOCUMENTS

| | | |
|---|---|---|
| JP | 2003-211770 A | 7/2003 |
| JP | 2007-79296 A | 3/2007 |
| JP | 2009-227371 A | 10/2009 |

* cited by examiner

*Primary Examiner* — Julian D Huffman
(74) *Attorney, Agent, or Firm* — Oliff PLC

(57) ABSTRACT

An image processing apparatus includes a processor. The processor is configured to set an image position of a reference image in a transport direction of a recording medium to an arbitrary position on a specific page of the recording medium. The reference image is formed using a first color and serves as a reference for an image position of an image of a second color to be formed after the image of the first color is formed. The processor is also configured to adjust the image position for the second color on an adjacent page, located adjacently upstream of the specific page in the transport direction, by using image information of the reference image formed on the specific page.

20 Claims, 8 Drawing Sheets

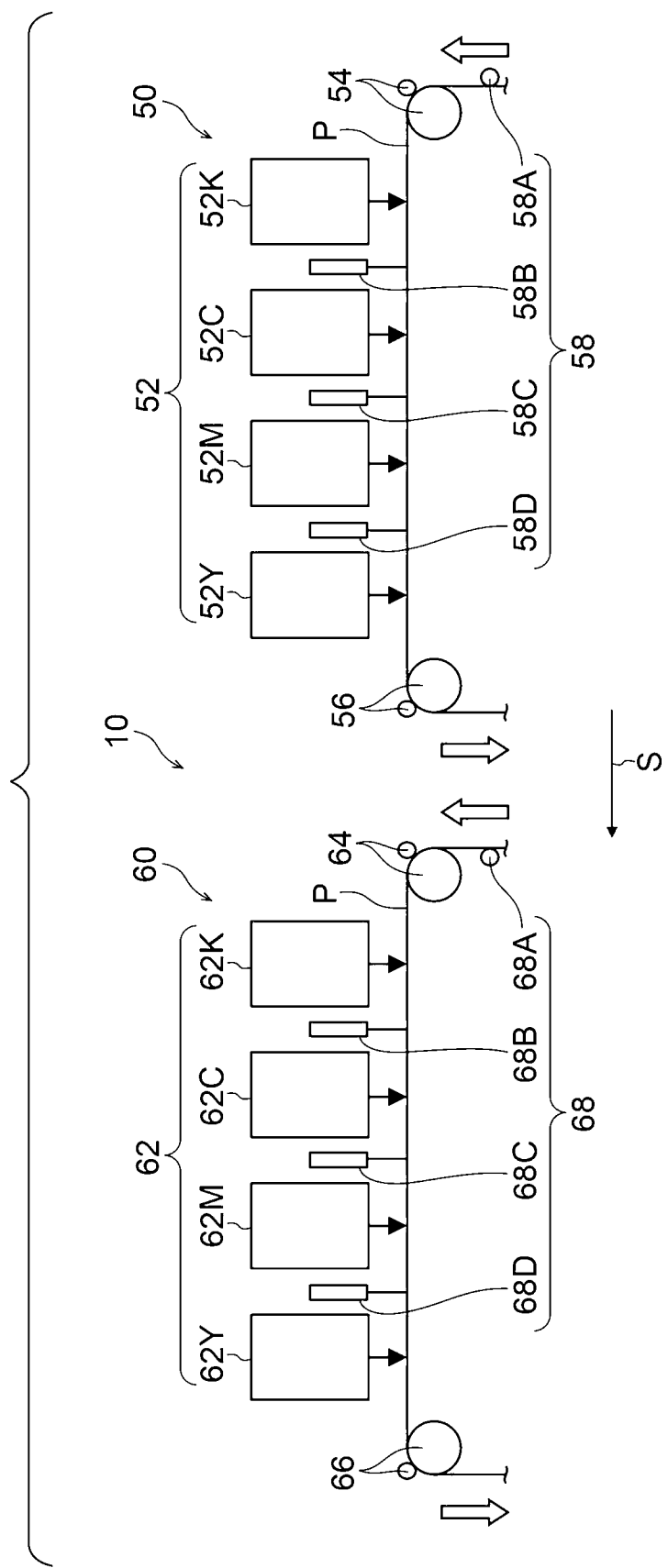

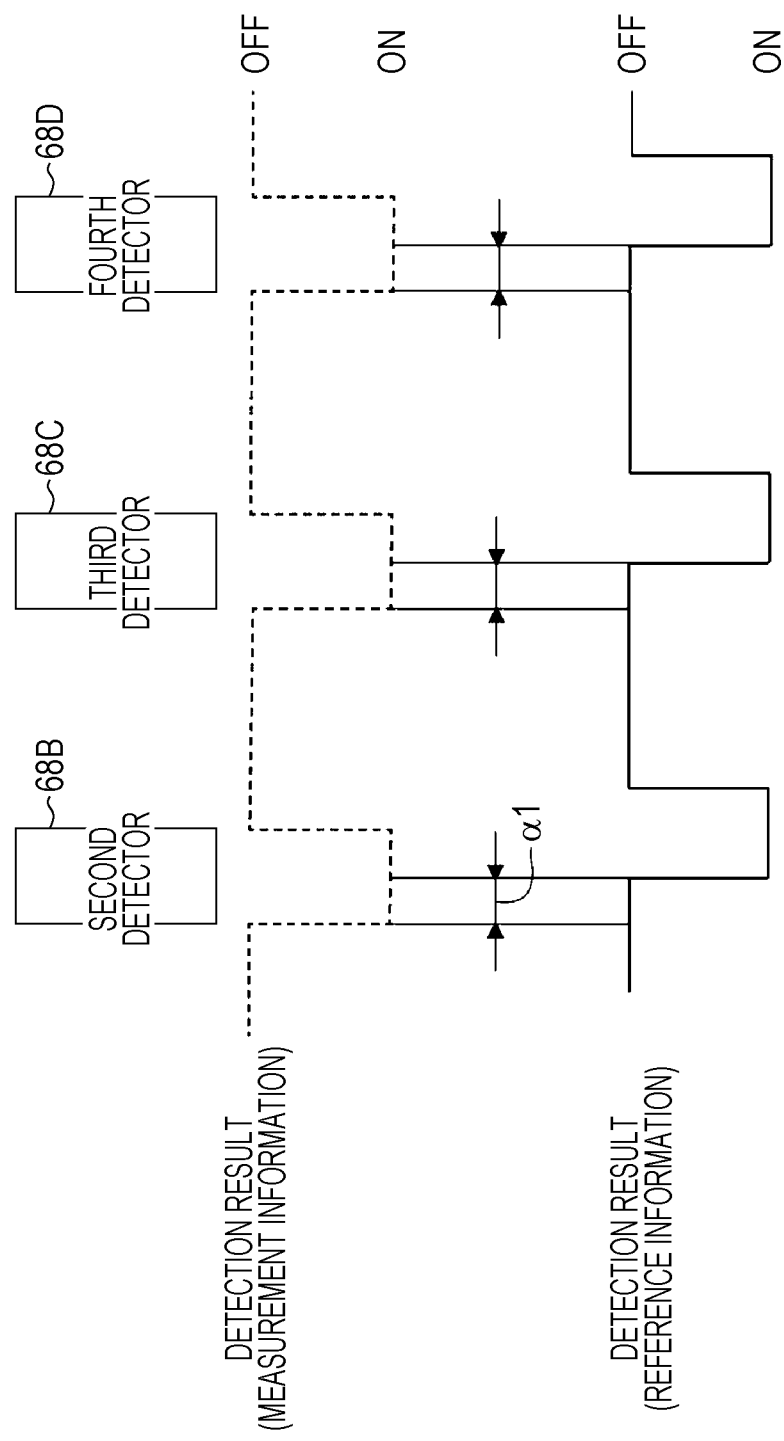

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-165543 filed Sep. 11, 2019.

BACKGROUND

(i) Technical Field

The present disclosure relates to image processing apparatuses and non-transitory computer readable media.

(ii) Related Art

Japanese Unexamined Patent Application Publication No. 2007-079296 discloses a technology for not only suppressing the occurrence of color misregistration, but also for preventing a mark used for detecting the color misregistration from remaining on a recording medium, such as paper.

SUMMARY

Aspects of non-limiting embodiments of the present disclosure relate to reducing a limitation on the position of a reference image when the image position of an image to be formed on a recording medium is to be adjusted, as compared with a configuration that detects a reference image formed on a leading end of a page and adjusts the image position of an image to be formed on the same page as the reference image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor. The processor is configured to set an image position of a reference image in a transport direction of a recording medium to an arbitrary position on a specific page of the recording medium. The reference image is formed using a first color and serves as a reference for an image position of an image of a second color to be formed after the image of the first color is formed. The processor is also configured to adjust the image position for the second color on an adjacent page, located adjacently upstream of the specific page in the transport direction, by using image information of the reference image formed on the specific page.

BRIEF DESCRIPTION OF THE DRAWINGS

Exemplary embodiments of the present disclosure will be described in detail based on the following figures, wherein:

FIG. 6 illustrates an example of the configuration of an image forming apparatus according to second and third exemplary embodiments;

FIGS. 8A and 8B illustrate an example of detection results obtained by detectors according to the third exemplary embodiment.

DETAILED DESCRIPTION

An inkjet-type image forming apparatus 10 according to an exemplary embodiment will be described below with reference to the drawings.

First Exemplary Embodiment

Figure 1:
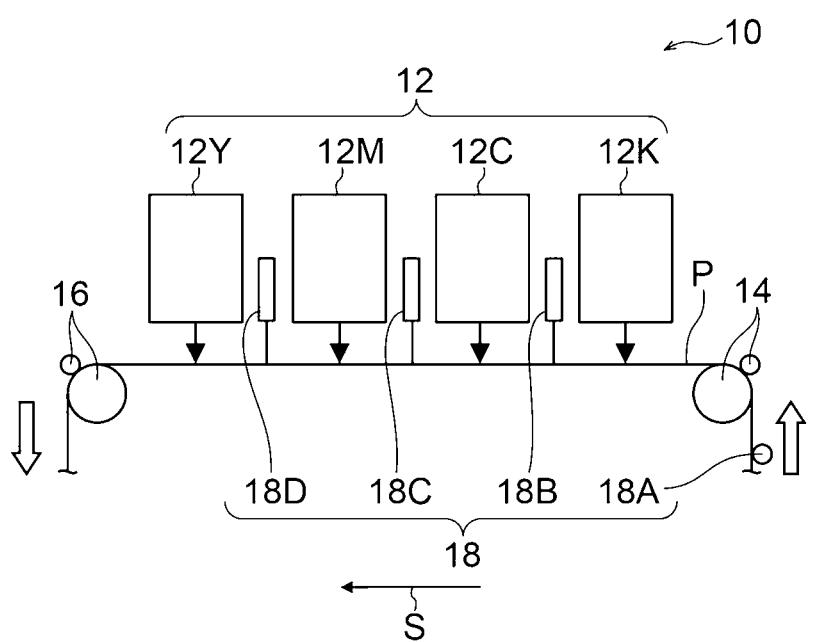
FIG. 1 illustrates an example of the configuration of an image forming apparatus according to a first exemplary embodiment.

As shown in FIG. 1, the image forming apparatus 10 as an example of an image processing apparatus includes a head unit 12, transport rollers 14 and 16, and a detector 18.

The head unit 12 forms an image on a continuous sheet (i.e., a roll sheet) P as a recording medium by ejecting ink droplets onto the continuous sheet P. The head unit 12 includes a head 12K that forms a black (K) image, a head 12C that forms a cyan (C) image, a head 12M that forms a magenta (M) image, and a head 12Y that forms a yellow (Y) image. In the first exemplary embodiment, the head 12K forms a K mark formed of a K-color image on the continuous sheet P. The K mark serves as a reference for C, M, and Y image positions. This will be described in detail later. The K color is an example of a first color, the C, M, and Y colors each are an example of a second color, and the K mark is an example of a reference image.

The heads of the head unit 12 are arranged in a transport direction S of the continuous sheet P in the order: K, C, M, and Y. The order in which the heads of the head unit 12 are arranged is not limited in particular. If C, M, Y, and K are not to be distinguished from one another in the following description, C, M, Y, and K added to the reference signs will be omitted. The head 12K is an example of a first image forming unit, and the heads 12C, 12M, and 12Y are an example of a second image forming unit.

In the first exemplary embodiment, nozzles of each head of the head unit 12 are individually given nozzle numbers starting from 1, such as 1, 2, and so on, so as to distinguish the nozzles from one another. In the first exemplary embodiment, the nozzles of each head of the head unit 12 are arranged in the width direction of the continuous sheet P (referred to as "sheet width direction" hereinafter).

The transport rollers 14 and 16 are rotatably supported by a frame member (not shown). The continuous sheet P is looped over the transport rollers 14 and 16. A winding roller (not shown) winds up the continuous sheet P by rotating in response to a rotational force received from a motor (not shown), so that the continuous sheet P is transported in the transport direction S.

The detector 18 includes a first detector 18A disposed upstream of the head 12K in the transport direction S, a second detector 18B disposed between the head 12K and the head 12C, a third detector 18C disposed between the head 12C and the head 12M, and a fourth detector 18D disposed between the head 12M and the head 12Y. Each detector 18 is configured to detect the K mark formed on the continuous sheet P. For example, each detector 18 radiates light onto the K mark formed on the continuous sheet P and causes a light receiving element to receive reflection light from the K mark, thereby detecting the image position of the K mark. Then, the detector 18 transmits the detected image position of the K mark to a controller 20, which will be described later.

Next, a hardware configuration of the image forming apparatus 10 will be described.

Figure 2:
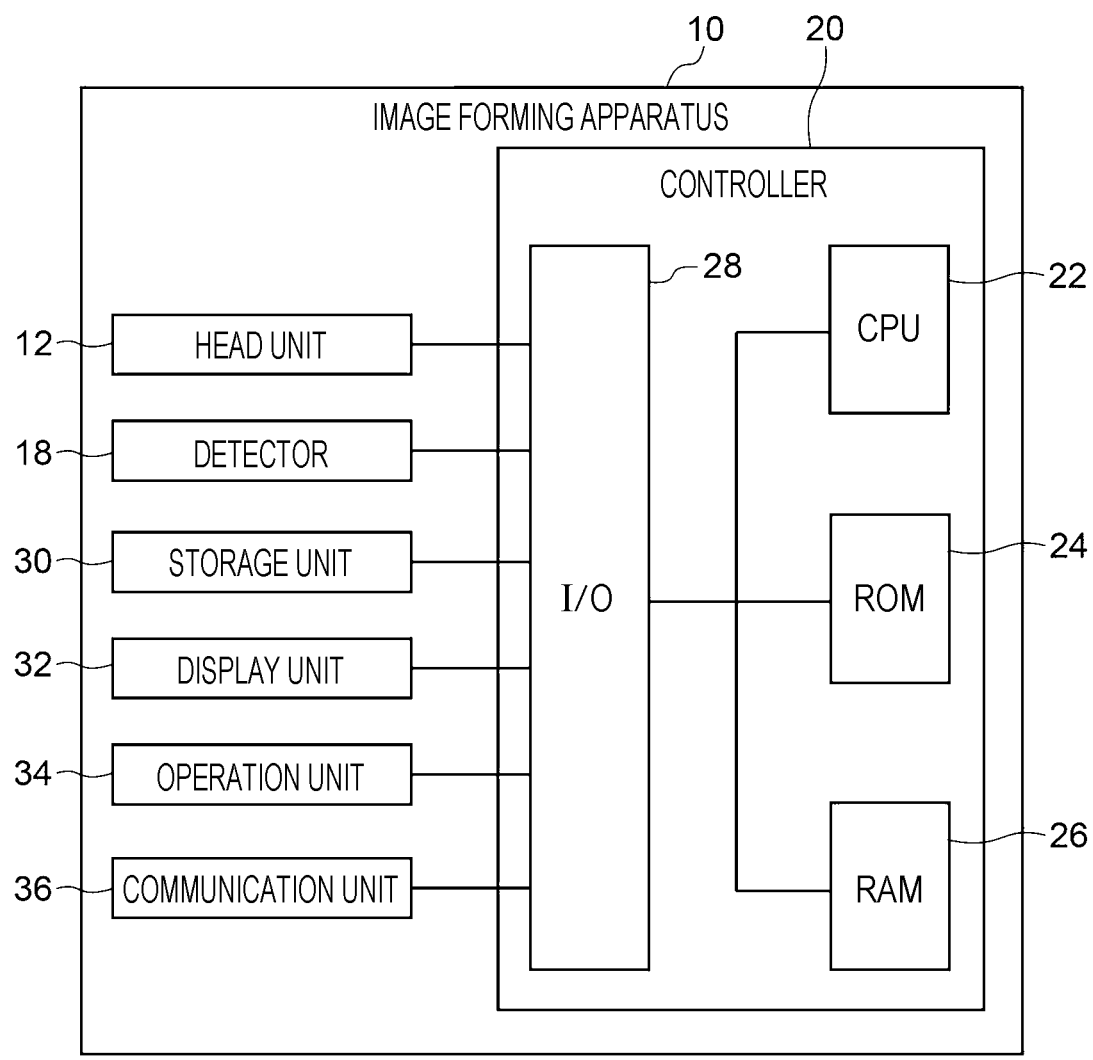
FIG. 2 is a block diagram illustrating a hardware configuration of the image forming apparatus according to this exemplary embodiment.

FIG. 2 is a block diagram illustrating the hardware configuration of the image forming apparatus 10.

As shown in FIG. 2, the image forming apparatus 10 includes the controller 20 that controls the operation of the image forming apparatus 10. In the controller 20, a central processing unit (CPU) 22, a read-only memory (ROM) 24, a random access memory (RAM) 26, and an input/output interface (I/O) 28 are connected to one another in a communicable manner via a bus.

The CPU 22 is a central processing unit that executes various types of programs and controls each component. Specifically, the CPU 22 reads a program from the ROM 24 and executes the program by using the RAM 26 as a work area. The CPU 22 performs control of the aforementioned components and various types of calculation processes in accordance with programs stored in the ROM 24.

The ROM 24 stores therein various types of programs and various types of data. The various types of programs at least include an image processing program for causing a computer to function as the CPU 22 of the image forming apparatus 10. The image processing program may be pre-installed in the image forming apparatus 10 or may be appropriately installed in the image forming apparatus 10 by being stored in a nonvolatile storage medium or by being distributed via a network. Assumed examples of the nonvolatile storage medium include a compact disc read-only memory (CD-ROM), a magneto-optical disk, a hard disk drive (HDD), a digital versatile disc read-only memory (DVD-ROM), a flash memory, and a memory card.

The RAM 26 serves as a work area for temporarily storing a program or data.

The I/O 28 is connected to the head unit 12, the detector 18, a storage unit 30, a display unit 32, an operation unit 34, and a communication unit 36.

The storage unit 30 is, for example, an HDD, a solid state drive (SSD), or a flash memory.

The display unit 32 is, for example, a liquid crystal display (LCD) or an electroluminescence display. The display unit 32 integrally has a touchscreen.

The operation unit 34 is provided with operation buttons for receiving various types of commands from a user using the image forming apparatus 10.

The display unit 32 and the operation unit 34 receive various types of commands from the user. The display unit 32 displays a result of a process executed in accordance with a command received from the user, as well as various types of information, such as a notification with respect to a process.

The communication unit 36 communicates with a terminal apparatus, such as a personal computer (not shown), via a network. The network used here is, for example, the Internet, a local area network (LAN), or a wide area network (WAN).

Next, the flow of how an image is formed on the continuous sheet P will be described with reference to FIGS. 3 to 5B.

In the first exemplary embodiment, image information of the K mark formed on a specific page by the head 12K is used to adjust image positions of the heads 12C, 12M, and 12Y in the transport direction S on an adjacent page located adjacently upstream of the specific page in the transport direction S.

Figure 3:
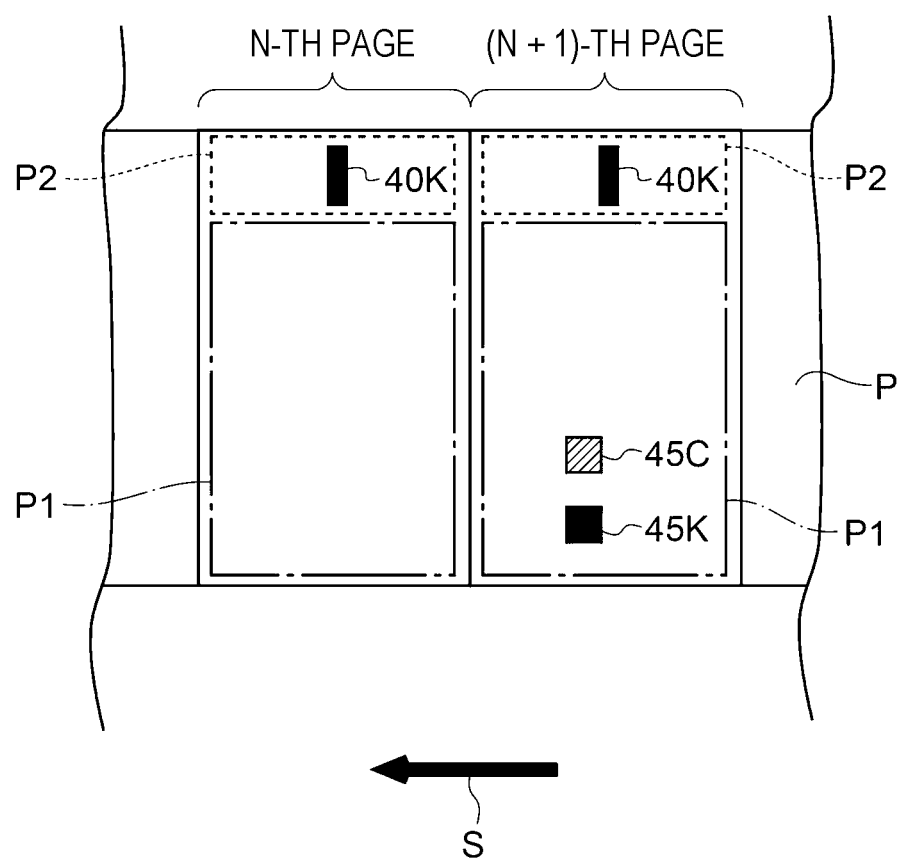
FIG. 3 schematically illustrates a specific page and an adjacent page of a continuous sheet in the first exemplary embodiment.

FIG. 3 schematically illustrates the specific page and the adjacent page in the continuous sheet P. In the following description with reference to FIG. 3, the specific page may sometimes be referred to as an "N-th page", and the adjacent page may sometimes be referred to as an "(N+1)-th page". Furthermore, in FIGS. 3 to 5B, the K mark serving as a reference image is illustrated as a black-colored rectangular graphic mark and is given a reference sign "40K".

The CPU 22 receives the settings of the image position (referred to as "image position settings" hereinafter) of the K mark 40K in the continuous sheet P. For example, in a case where the user operates an image-position-setting button (not shown) displayed on the display unit 32, the CPU 22 receives the image position settings.

As shown in FIG. 3, each page of the continuous sheet P is divided into a "print image region P1" indicated with a single-dot chain line and where a print image according to a print job is to be formed and an "end region P2" indicated with a dashed line and corresponding to a widthwise end of the continuous sheet P. This end region P2 is a part to be cut off from the continuous sheet P before shipment. The K mark 40K is preset to be formable in the end region P2 but not formable in the print image region P1.

Figure 4:
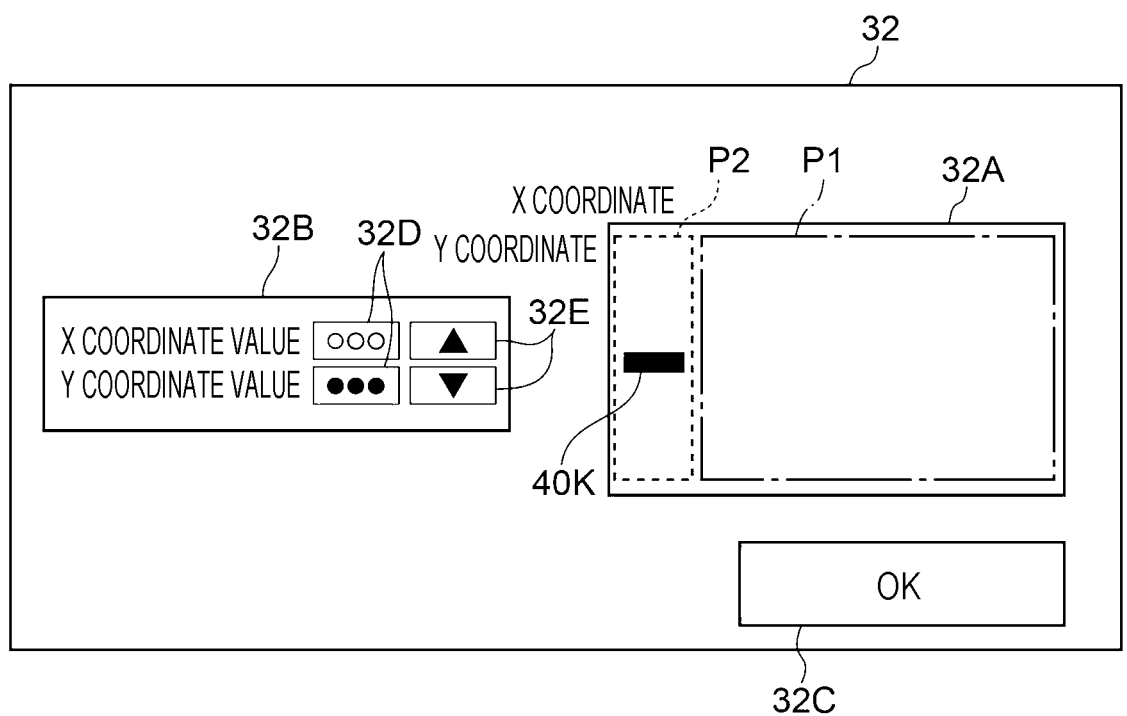
FIG. 4 illustrates a display example of a display unit according to the first exemplary embodiment.

When the image position settings are received, the CPU 22 causes the display unit 32 to display an input screen for the image position of the K mark 40K shown in FIG. 4. As shown in FIG. 4, the display unit 32 displays a preview 32A, a coordinate-value input screen 32B, and an OK button 32C as the image position settings. By displaying the coordinate-value input screen 32B and allowing coordinate values to be input thereto, the image position of the K mark 40K is settable to an arbitrary position in the transport direction S. The coordinate-value input screen 32B is constituted of a numerical section 32D used for inputting numerical values thereto and a changing section 32E used for incrementing and decrementing the numerical values input to the numerical section 32D.

When the user inputs an X coordinate value and a Y coordinate value and operates the OK button 32C, if the image position corresponding to the input coordinate values is within the end region P2, the CPU 22 sets the image position as the image position of the K mark 40K.

In contrast, if the image position corresponding to the coordinate values input by the user is not within the end region P2, that is, if the image position is not settable as the image position of the K mark 40K, the CPU 22 causes the display unit 32 to display a position settable as the image position of the K mark 40K.

Figure 5A:
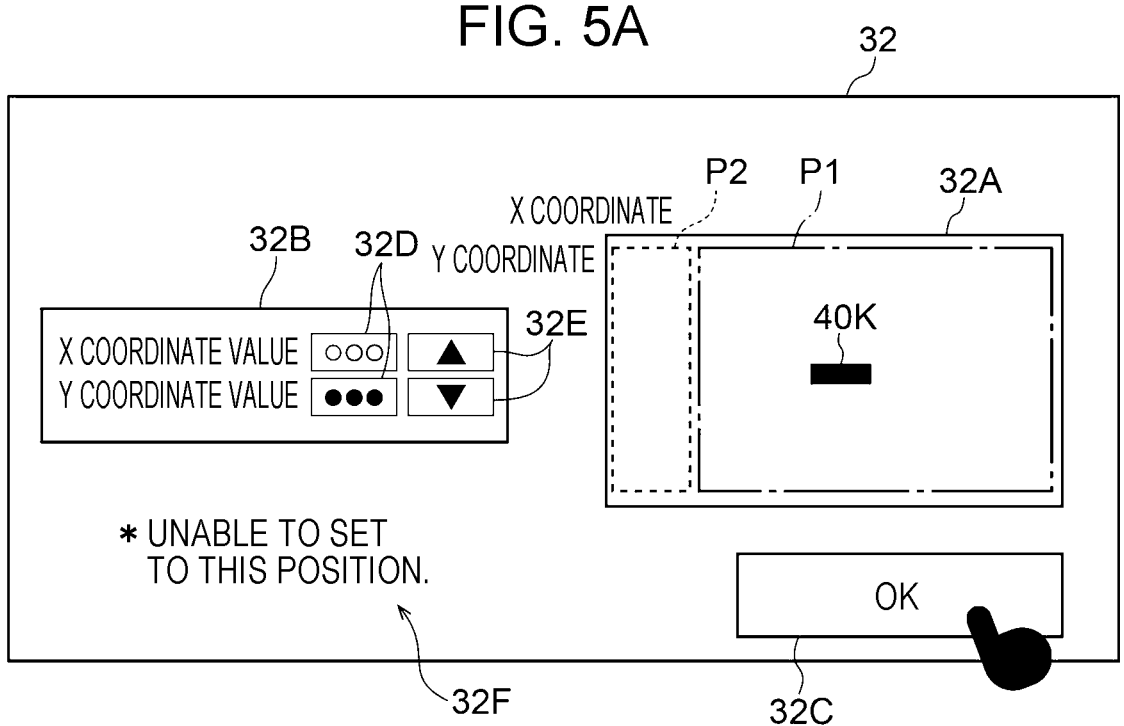
FIGS. 5A and 5B illustrate a display example of the display unit according to the first exemplary embodiment.
Figure 5B:
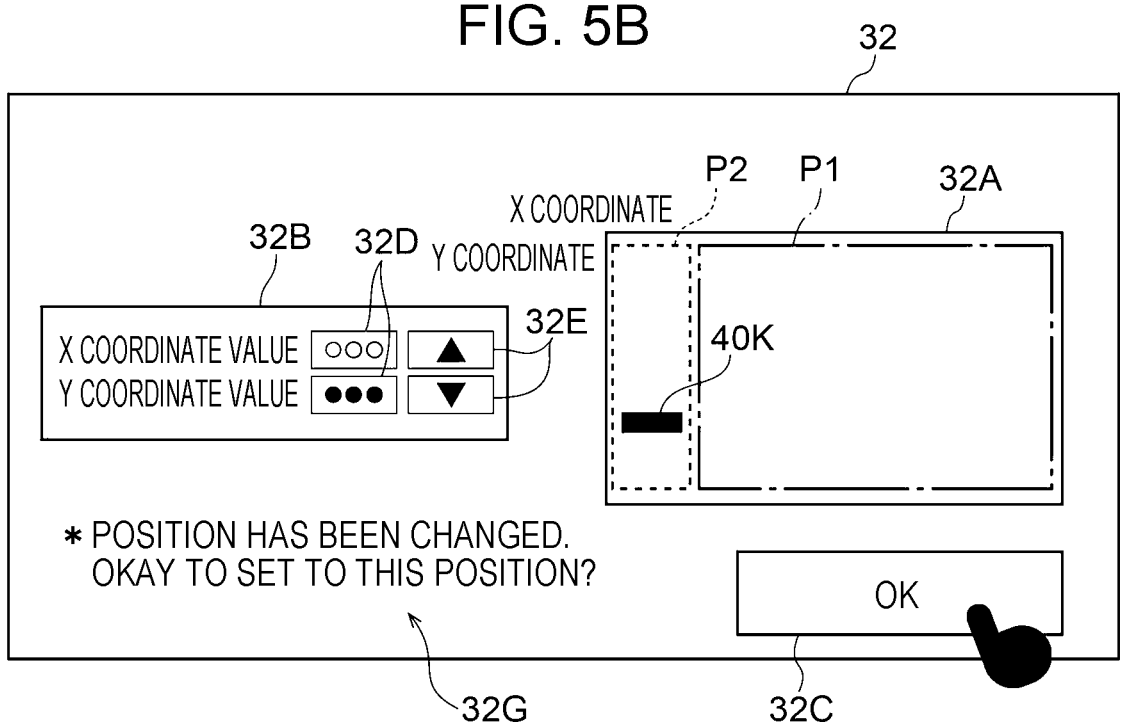

As shown in FIG. 5A, for example, if the image position corresponding to the coordinate values input by the user is within the print image region P1, the CPU 22 causes the display unit 32 to display a warning message 32F indicating that the image position is not settable as the image position of the K mark 40K. Subsequently, as shown in FIG. 5B, the CPU 22 causes the display unit 32 to display the K mark 40K within the end region P2 of the preview 32A and to display a change message 32G, in place of the warning message 32F, indicating that the image position corresponding to the coordinate values input by the user has been changed. In this case, the position of the K mark 40K displayed within the end region P2 of the preview 32A in FIG. 5B is a candidate position, and the position of the K mark 40K is movable by allowing the user to input coordinate values again.

If a print job is input to the controller 20 via the communication unit 36 after the process for setting the image position is completed, an image is formed on the continuous sheet P as follows.

The image forming apparatus 10 includes a rotary encoder (not shown) that is provided at the rotation shaft of the transport roller 14 or 16 and that outputs a clock signal every time the transport roller 14 or 16 rotates by a predetermined angle. The heads of the head unit 12 are driven with reference to the clock signal output from the rotary encoder.

First, as shown in FIG. 3, the head 12K forms a K mark 40K at the image position set based on the above-described image position settings in the end region P2 on the N-th page.

Furthermore, the head 12K forms a K-color image (referred to as "K image 45K" hereinafter) in the print image region P1 on the (N+1)-th page. In this case, the head 12K forms a black-colored square graphic mark shown in FIG. 3 as the K image 45K. Moreover, the head 12K forms a K mark 40K at the image position set based on the above-described image position settings in the end region P2 on the (N+1)-th page. This K mark 40K on the (N+1)-th page is used for adjusting the image positions of the heads 12C, 12M, and 12Y in the transport direction S on an (N+2)-th page located adjacently upstream of the (N+1)-th page in the transport direction S. In this case, the (N+1)-th page corresponds to a "specific page", and the (N+2)-th page corresponds to an "adjacent page".

The second detector 18B detects the K mark 40K on the N-th page when the K mark 40K reaches the detection range as a result of transporting of the continuous sheet P, and transmits the detection result of the detected K mark 40K as measurement information to the controller 20. This "measurement information" is information with which the image position of the K mark 40K is specifiable in accordance with switching between on and off states of a waveform. The on and off states are switched based on the intensity of reflection light received by the light receiving element of the detector 18. The measurement information is an example of image information.

Subsequently, the CPU 22 compares the measurement information transmitted from the second detector 18B with reference information corresponding to the measurement information and stored in the ROM 24. If the displacement amount in the transport direction S is larger than or equal to a threshold value, the CPU 22 adjusts the image position of the head 12C in the transport direction S on the (N+1)-th page. For the adjustment, the CPU 22 advances or retards the ink-droplet ejection timing from the nozzles. Specifically, if the detection timing of the detector 18 is earlier than expected, the CPU 22 advances the ink-droplet ejection timing by the corresponding amount, or if the detection timing of the detector 18 is later than expected, the CPU 22 retards the ink-droplet ejection timing by the corresponding amount.

The reference information is information about the K mark 40K detected by each detector 18 at a reference timing different from the measurement timing. This reference information is transmitted to the controller 20 after the K mark 40K is detected by each detector 18, and is preliminarily stored in the ROM 24 as reference information indicating a reference image position of each head of the head unit 12 with respect to the continuous sheet P.

Then, the head 12C forms a C color image (referred to as "C image 45C" hereinafter) in the print image region P1 on the (N+1)-th page. In this case, the head 12C forms a diagonally-shaded square graphic mark shown in FIG. 3 as the C image 45C. The head 12C ejects ink droplets at the ejection timing adjusted by the CPU 22 in view of the detection result obtained by the second detector 18B. Specifically, the head 12C shifts the ink-droplet ejection timing from the reference timing to cope with misregistration of the image position occurring in the transport direction S. This "misregistration of the image position" is so-called color misregistration, which is displacement of a relative position with an image formed by each head of the head unit 12.

Since the subsequent flow is similar to that described above, a description thereof will be omitted.

Effects

When the image position of an image to be formed on a continuous sheet P is to be adjusted in the related art, a K mark formed at the leading end of a page is detected, and the image position of an image to be formed on the same page as the K mark is adjusted (this configuration will be referred to as "comparative configuration A" hereinafter).

However, in the comparative configuration A, the K mark has to be formed at the leading end of the same page, that is, the upstream end thereof in the transport direction S, for correcting color misregistration on the same page, thus resulting in a limitation on the position of the K mark.

In contrast, in the first exemplary embodiment, the CPU 22 sets the image position of the K mark in the transport direction S to an arbitrary position on a specific page of the continuous sheet P and uses the K mark on the specific page to adjust the image positions for the C, M, and Y colors on the adjacent page located adjacently upstream of the specific page in the transport direction S. Accordingly, in the first exemplary embodiment, the K mark does not have to be formed at the leading end of the same page to cope with color misregistration on the same page. Specifically, in the first exemplary embodiment, the K mark may be formed at an arbitrary position in the transport direction S on the specific page.

Therefore, in the first exemplary embodiment, the limitation on the position of the K mark may be reduced, as compared with the comparative configuration A.

Furthermore, in the first exemplary embodiment, the CPU 22 causes the display unit 32 to display an input screen where an arbitrary position in the transport direction S on the specific page is settable. Therefore, in the first exemplary embodiment, the user may set an arbitrary position by operating the display unit 32.

Furthermore, in the first exemplary embodiment, if the position input by operating the input screen, which is where an arbitrary position in the transport direction S on the specific page is settable, is not settable as the image position of the K mark, the CPU 22 causes the display unit 32 to display a position settable as the image position of the K mark. Therefore, in the first exemplary embodiment, the time spent for setting the image position of the K mark may be reduced, as compared with a configuration where an operation has to be continuously performed until a settable position is input when the position input by operating the input screen, which is where an arbitrary position in the transport direction S on the specific page is settable, is not settable as the image position of the K mark.

Second Exemplary Embodiment

Next, a second exemplary embodiment will be described while omitting or simplifying features that are redundant with other exemplary embodiments.

FIG. 6 illustrates an example of the configuration of an image forming apparatus 10 according to the second exemplary embodiment. This image forming apparatus 10 has a so-called cascade configuration and includes a first image forming device 50 as a first cascade device, a second image forming device 60 as a second cascade device, and an inverting device (not shown) that is disposed between the first image forming device 50 and the second image forming device 60 and that inverts the front and rear faces of the continuous sheet P.

Although the configurations of the first image forming device 50 and the second image forming device 60 shown in FIG. 6 are identical to the configuration of the image forming apparatus 10 according to the first exemplary embodiment shown in FIG. 1, reference signs different from those of the components of the image forming apparatus 10 according to the first exemplary embodiment are given to the components of each of the first image forming device 50 and the second image forming device 60.

The first image forming device 50 includes a head unit 52, transport rollers 54 and 56, and a detector 58. The head unit 52 includes a head 52K, a head 52C, a head 52M, and a head 52Y. The detector 58 includes a first detector 58A, a second detector 58B, a third detector 58C, and a fourth detector 58D.

The second image forming device 60 includes a head unit 62, transport rollers 64 and 66, and a detector 68. The head unit 62 includes a head 62K, a head 62C, a head 62M, and a head 62Y. The detector 68 includes a first detector 68A, a second detector 68B, a third detector 68C, and a fourth detector 68D. The first detector 68A detects a K mark (referred to as "front-face K mark" hereinafter) formed on a first face (referred to as "front face" hereinafter) of the continuous sheet P. The front-face K mark is an example of a preliminarily-formed specific image.

Since the hardware configuration of the image forming apparatus 10 according to the second exemplary embodiment is identical to the hardware configuration of the image forming apparatus 10 according to the first exemplary embodiment shown in FIG. 2, the components are given the same reference signs as those in the first exemplary embodiment.

The image forming apparatus 10 forms an image on the front face of the continuous sheet P by using the first image forming device 50, inverts the front and rear faces of the continuous sheet P by using the inverting device, and then forms an image on a second face (referred to as "rear face" hereinafter) of the continuous sheet P by using the second image forming device 60.

In this case, a front-face K mark is formed on the front face of the continuous sheet P in the first image forming device 50, the front-face K mark is detected by the first detector 68A in the second image forming device 60, and the detection result is transmitted as measurement information to the controller 20. Then, the CPU 22 drives the head 62K at an image formation timing based on the measurement information of the front-face K mark, so as to form a K mark (referred to as "rear-face K mark" hereinafter) and a K image on the rear face of the continuous sheet P. Subsequently, in the second image forming device 60, the second detector 68B, the third detector 68C, and the fourth detector 68D individually detect the rear-face K mark and transmit the detection result as measurement information to the controller 20. Then, the CPU 22 drives the head 62C, the head 62M, or the head 62Y at an image formation timing based on the measurement information of the rear-face K mark, so as to form a C, M, or Y image on the rear face of the continuous sheet P. The M image is an M-color image formed by the head 62M, and the Y image is a Y-color image formed by the head 62Y.

Specifically, in the second exemplary embodiment, it is assumed that, when an image is to be formed on the rear face of the continuous sheet P, the head 62K forms a rear-face K mark and a K image based on measurement information of a front-face K mark, and the head 62C, 62M, or 62Y forms a C, M, or Y image based on measurement information of the rear-face K mark, unlike in the first exemplary embodiment where each head is driven with reference to a clock signal output from the rotary encoder. There is also a configuration (referred to as "comparative configuration B" hereinafter) that has this assumed configuration and that processes a rear-face K mark to be formed on a specific page and a K image to be formed on an adjacent page as different pieces of data. In the comparative configuration B, image data of the rear-face K mark on the specific page and image data of the K image on the adjacent page are treated as image data of different pages.

Furthermore, in the comparative configuration B, if the first detector 68A detects a front-face K mark, the same ejection signal for forming a rear-face K mark and a K image is transmitted to the head 62K. Then, in the comparative configuration B, only a rear-face K mark is formed on the leading page of the rear face of the continuous sheet P, and a rear-face K mark, a K image, a C image, an M image, and a Y image are formed on the second page and onward. In this case, the head 62K forms the rear-face K mark on the leading page based on first detection of the front-face K mark by the first detector 68A, and forms the rear-face K mark and the K image on the second page based on second detection of the front-face K mark by the first detector 68A. Furthermore, the head 62C, the head 62M, and the head 62Y form the C image, the M image, and the Y image on the second page based on detection of the rear-face K mark on the leading page by the second detector 68B, the third detector 68C, and the fourth detector 68D. The "leading page of the rear face of the continuous sheet P" refers to an area where a print image according to a print job does not exist on the corresponding front face of the continuous sheet P.

In the comparative configuration B configured as above, for example, color misregistration may possibly occur among the K image, the C image, the M image, and the Y image based on the accuracy of the first detector 68A for reading the front-face K mark. For example, in the comparative configuration B, in a case where the leading page of the rear face of the continuous sheet P is set as a "specific page" and the second page is set as an "adjacent page", if first measurement information of the front-face K mark deviates from second measurement information of the front-face K mark, color misregistration occurs in the transport direction S by the difference therebetween among the K image, the C image, the M image, and the Y image on the adjacent page.

The second exemplary embodiment copes with the aforementioned problem and causes the CPU 22 to perform an image forming process by treating the rear-face K mark to be formed on the specific page of the rear face of the continuous sheet P and the K image to be formed on the adjacent page of the rear face of the continuous sheet P as a single group. In this case, the rear-face K mark is an example of a reference image, and the K image is an example of a normal image.

The image forming process performed in the second exemplary embodiment will be described below with reference to FIG. 7.

Figure 7:
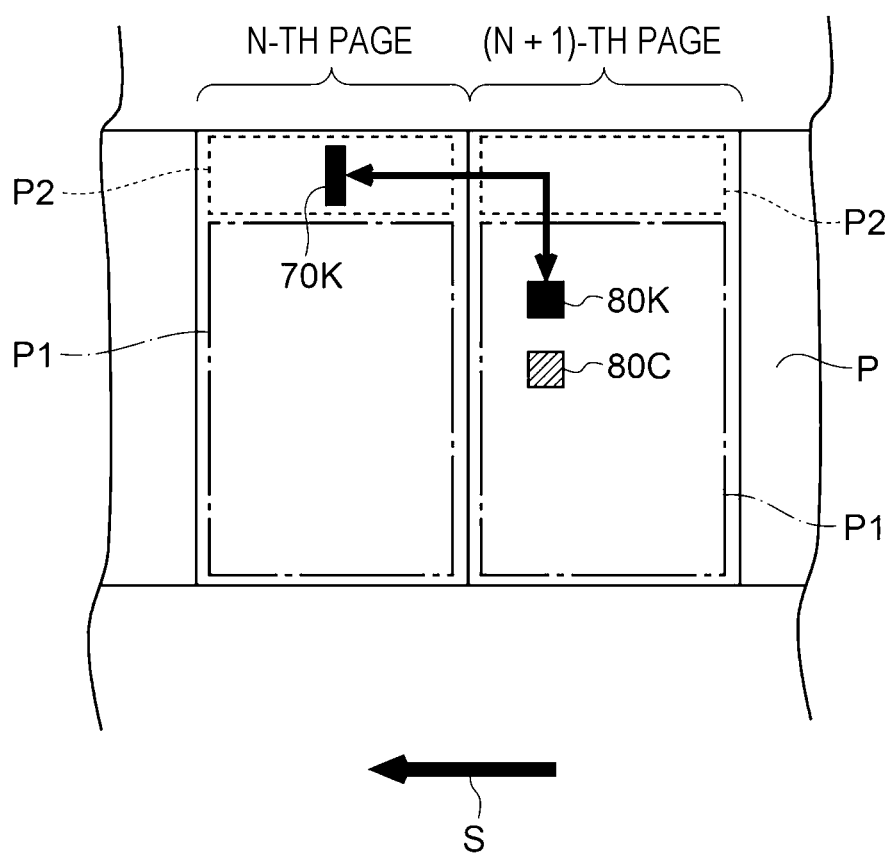
FIG. 7 schematically illustrates a specific page and an adjacent page of a continuous sheet in the second exemplary embodiment.

FIG. 7 schematically illustrates a specific page and an adjacent page of the rear face of the continuous sheet P. In the following description with reference to FIG. 7, the specific page may sometimes be referred to as an "N-th page", and the adjacent page may sometimes be referred to as an "(N+1)-th page". The specific page shown in FIG. 7, that is, the N-th page, is the leading page of the rear face of the continuous sheet P. Furthermore, in FIG. 7, a "rear-face K mark" is given a reference sign "70K", and a "K image" is given a reference sign "80K". K and C images shown in FIG. 7 are simplified examples used in the description of the second exemplary embodiment, and images different from these examples may be used as the K and C images.

The CPU 22 performs the aforementioned image forming process by processing the rear-face K mark 70K on the N-th page and the K image 80K on the (N+1)-th page as a single piece of data. In the second exemplary embodiment, the image region on each page is divided into a print image region P1 and an end region P2, and image data is divided between the print image region P1 and the end region P2 on each page. Accordingly, in the second exemplary embodiment, the CPU 22 is capable of treating the end region P2 on the specific page and the print image region P1 on the adjacent page as the same page across two successive pages worth of K-color image data. For example, in the case shown in FIG. 7, the CPU 22 treats the end region P2 on the N-th page and the print image region P1 on the (N+1)-th page as the same page, and processes image data of the rear-face K mark 70K on the N-th page and image data of the K image 80K on the (N+1)-th page as a single piece of data. In this case, the image data of the rear-face K mark 70K on the N-th page and the image data of the K image 80K on the (N+1)-th page may also be regarded as having common coordinates used for determining the image position of the image data.

The first detector 68A detects a front-face K mark when the front-face K mark reaches the detection range as a result of transporting of the continuous sheet P, and transmits the detection result of the detected front-face K mark as measurement information to the controller 20.

Subsequently, at an image formation timing based on the acquired measurement information of the front-face K mark, the CPU 22 transmits an ejection signal as an image formation command for forming a rear-face K mark 70K on the N-th page and a K image 80K on the (N+1)-th page to the head 62K. In detail, the CPU 22 transmits, to the head 62K, ejection signals divided into a first K-color ejection signal for forming the rear-face K mark 70K in the end region P2 on the N-th page and a second K-color ejection signal for forming the K image 80K in the print image region P1 on the (N+1)-th page.

The head 62K acquiring the first K-color ejection signal forms the rear-face K mark 70K in the end region P2 on the N-th page. Moreover, the head 62K acquiring the second K-color ejection signal forms the K image 80K in the print image region P1 on the (N+1)-th page.

Every time the first detector 68A detects a front-face K mark, the first detector 68A transmits the measurement information of the detected front-face K mark to the controller 20. Every time the CPU 22 acquires measurement information of a front-face K mark, the CPU 22 transmits, to the head 62K, an ejection signal for forming a rear-face K mark 70K on the specific page and a K image 80K on the adjacent page at an image formation timing based on the acquired measurement information of the front-face K mark. Every time the head 62K acquires a first K-color ejection signal, the head 62K forms a rear-face K mark 70K in the end region P2 of the specific page based on the acquired first K-color ejection signal. Furthermore, every time the head 62K acquires a second K-color ejection signal, the head 62K forms a K image 80K in the print image region P1 on the adjacent page based on the acquired second K-color ejection signal.

Therefore, although not shown in FIG. 7, when the first detector 68A detects a front-face K mark for the second time following the first detection described above, the following image forming process is performed by the head 62K. In this case, the head 62K forms a rear-face K mark in the end region P2 on the (N+1)-th page as a specific page, and forms a K image in the print image region P1 on the (N+2)-th page as an adjacent page.

Accordingly, in the second exemplary embodiment, only a rear-face K mark 70K is formed on the N-th page, that is, the leading page, of the rear face of the continuous sheet P, and a rear-face K mark 70K and a K image 80K are formed on the (N+1)-th page and onward.

Subsequently, the second detector 68B detects the rear-face K mark 70K on the N-th page when the rear-face K mark 70K reaches the detection range as a result of transporting of the continuous sheet P, and transmits the detection result of the detected rear-face K mark 70K as measurement information to the controller 20.

Then, when the second detector 68B detects the rear-face K mark 70K on the N-th page, the CPU 22 uses the measurement information of the detected rear-face K mark 70K to adjust the image position of a C image to be formed on the (N+1)-th page by the head 62C. In detail, the CPU 22 transmits, to the head 62C, a C-color ejection signal for forming a C image in the print image region P1 on the (N+1)-th page at an image formation timing based on the acquired measurement information of the rear-face K mark 70K.

The head 62C acquiring the C-color ejection signal forms a C image 80C in the print image region P1 on the (N+1)-th page. In FIG. 7, a "C image" is given a reference sign "80C".

Since the subsequent flow is similar to that described above, a description thereof will be omitted.

In the second exemplary embodiment having the above-described configuration, color misregistration in the transport direction S may be suppressed, as compared with the comparative configuration B.

In detail, in the second exemplary embodiment, a rear-face K mark is formed on a specific page and a K image is formed on an adjacent page by the head 62K by using first measurement information of a front-face K mark. Moreover, in the second exemplary embodiment, C, M, and Y images are formed on the adjacent page by the heads 62C, 62M, and 62Y by using measurement information of the rear-face K mark on the specific page.

Specifically, in the second exemplary embodiment, the image formation timings for the K, C, M, and Y images on the adjacent page are set based on the first measurement information of the front-face K mark. Therefore, according to the second exemplary embodiment, even if the first detection timing of the front-face K mark is advanced or retarded, the image positions of the K, C, M, and Y images on the adjacent page are shifted by the same amount in the transport direction S, so that color misregistration may be suppressed.

Third Exemplary Embodiment

Next, a third exemplary embodiment will be described while omitting or simplifying features that are redundant with other exemplary embodiments.

The third exemplary embodiment has components assumed to be the same as those in the second exemplary embodiment, and copes with the problem indicated in the second exemplary embodiment by replacing relevant components in the second exemplary embodiment. The configuration of the third exemplary embodiment will be described below with reference to FIGS. 8A and 8B.

The first detector 68A detects a front-face K mark when the front-face K mark reaches the detection range as a result of transporting of the continuous sheet P, and transmits the detection result of the detected front-face K mark as measurement information to the controller 20.

At an image formation timing based on the acquired measurement information of the front-face K mark, the CPU 22 transmits, to the head 62K, an ejection signal for forming a rear-face K mark on a specific page and a K image on an adjacent page.

The head 62K acquiring the ejection signal forms a rear-face K mark in the end region on the specific page and a K image in the print image region on the adjacent page.

Subsequently, the second detector 68B detects the rear-face K mark on the specific page when the rear-face K mark reaches the detection range as a result of transporting of the continuous sheet P, and transmits the detection result of the detected rear-face K mark as measurement information to the controller 20. In FIG. 8A, the measurement information of the rear-face K mark detected by the second detector 68B, the third detector 68C, and the fourth detector 68D is indicated by a dashed waveform.

Subsequently, the CPU 22 compares the measurement information transmitted from the second detector 68B with reference information corresponding to the measurement information and stored in the ROM 24. If the displacement amount in the transport direction S is larger than or equal to a threshold value, the CPU 22 adjusts the image position of the head 62C in the transport direction S on the adjacent page. This reference information is preliminarily stored in the ROM 24 as reference information that is transmitted to the controller 20 after the rear-face K mark is detected by each detector 68 during a reference period and that indicates a reference image position of each head of the head unit 62 on the continuous sheet P. In FIG. 8B, the reference information of the rear-face K mark detected by the second detector 68B, the third detector 68C, and the fourth detector 68D and stored in the ROM 24 is indicated by a solid waveform. Measurement information is an example of image information of a reference image, and reference information is an example of reference information of a reference image.

When the CPU 22 acquires the measurement information from the second detector 68B, the CPU 22 compares the measurement information with the reference information corresponding to the measurement information. For example, the CPU 22 determines a difference α1 between a start point of an ON period for the measurement information by the second detector 68B and a start point of an ON period for the reference information corresponding to the measurement information, and calculates a displacement amount in the transport direction S and a displacement direction from a reference image position. In this case, in FIGS. 8A and 8B, it is assumed that the displacement amount in the transport direction S is larger than or equal to a threshold value.

Therefore, in order to cope with the displacement amount, the CPU 22 adjusts the image position of the head 62C in the transport direction S on the adjacent page, and advances or retards the ink-droplet ejection timing from the nozzles.

The head 62C forms a C image in the print image region on the adjacent page. In this case, because the head 62C has undergone the adjustment described above, the ink-droplet ejection timing from the nozzles is advanced or retarded from that during a reference period.

Since the subsequent flow is similar to that described above, a description thereof will be omitted.

In the third exemplary embodiment, if a rear-face K mark formed on a specific page is detected, the CPU 22 uses measurement information of the detected rear-face K mark and reference information of the rear-face K mark, so as to adjust the image positions of C, M, and Y images on an adjacent page.

Specifically, in the third exemplary embodiment, the displacement amount in the transport direction S and the displacement direction are calculated by using a difference between the measurement information and the reference information, and the ink-droplet ejection timing on the adjacent page is advanced or retarded before the head 62C, the head 62M, and the head 62Y form images, whereby the image positions of the C, M, and Y images are adjusted.

Therefore, according to the third exemplary embodiment, color misregistration in the transport direction S may be suppressed, as compared with a configuration that adjusts the image positions of the C, M, and Y images on the adjacent page by using one of the measurement information and the reference information of the rear-face K mark.

Miscellaneous Features

In the above exemplary embodiments, an image position in the transport direction S is adjusted by advancing or retarding the ink-droplet ejection timing from the nozzles. Alternatively, this adjustment may involve shifting a target head, which is to be adjusted, of the head unit in the transport direction S. In this case, the CPU 22 uses the detection result of each detector to calculate the shift amount of the target head of the head unit in the transport direction S. Then, by driving a shifter, such as an actuator, the target head of the head unit is shifted in the transport direction S by the shift amount calculated by the CPU 22.

As an alternative to the above exemplary embodiments in which the image forming apparatus 10 is of an inkjet type, the image forming apparatus 10 is not limited to an inkjet type.

As an alternative to the above exemplary embodiments in which the image forming apparatus 10 is an example of an image processing apparatus, a terminal apparatus, such as another personal computer, may be an example of an image processing apparatus. Specifically, a processor included in the terminal apparatus may perform the process of the CPU 22 included in the image forming apparatus 10 according to any one of the above exemplary embodiments.

In the above exemplary embodiments, an X coordinate value and a Y coordinate value are inputtable via the coordinate-value input screen 32B to the image forming apparatus 10 according to the first exemplary embodiment. Alternatively, the X coordinate value for setting the image position of the K mark in the sheet width direction may be non-inputtable, and only the Y coordinate value for setting the image position of the K mark in the transport direction S may be inputtable.

With regard to the above exemplary embodiments, in the image forming apparatus 10 according to the first exemplary embodiment, the image positions of the heads 12C, 12M, and 12Y in the transport direction S on the adjacent page are adjusted by comparing the measurement information with the reference information corresponding to the measurement information. Alternatively, in the image forming apparatus 10 according to the first exemplary embodiment in which an image forming process is performed only on the front face of the continuous sheet P, the aforementioned adjustment may be performed using the measurement information alone without using the reference information.

With regard to the above exemplary embodiments, the image forming apparatus 10 according to the first exemplary embodiment as well as the first image forming device 50 according to one of the second and third exemplary embodiments do not perform the image forming process of the CPU 22 described in the second or third exemplary embodiment, but may alternatively perform this image forming process. By performing this image forming process, if the continuous sheet P used has a specific mark pre-printed thereon, color misregistration may be suppressed by forming an image using the head K based on detection of the specific mark.

In the above exemplary embodiments, the third exemplary embodiment is configured by replacing the configuration of the second exemplary embodiment. Alternatively, the image forming process of the CPU 22 in the second exemplary embodiment may be performed in the third exemplary embodiment. Specifically, in the above exemplary embodiments, the image forming process of the CPU 22 may be performed both in the second and third exemplary embodiments.

In the above exemplary embodiments, if a rear-face K mark formed on a specific page is detected in the third exemplary embodiment, the CPU 22 uses the measurement information of the detected rear-face K mark and the reference information of the rear-face K mark to adjust the image positions of C, M, and Y images on an adjacent page.

Alternatively, if the first detector 68A detects a front-face K mark, the CPU 22 may use the measurement information of the detected front-face K mark and preliminarily-acquired reference information of the front-face K mark to adjust the image positions of C, M, and Y images on the adjacent page. In this case, the reference information of the front-face K mark is transmitted to the controller 20 based on detection of the front-face K mark by the first detector 68A during a reference period, and is preliminarily stored in the ROM 24.

In the exemplary embodiments above, the CPU 22 included in the image forming apparatus 10 is an example of a processor. The term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

In the exemplary embodiments above, the K color is an example of a first color, and the C, M, and Y colors each are an example of a second color. Specifically, in the exemplary embodiments above, the image forming apparatus 10 performs full-color printing by using the first color and the second color as different colors. Alternatively, the first color and the second color do not necessarily have to be different colors and may be the same color so long as the image forming process using the second color is performed after the image forming process using the first color. Specifically, the configuration described in any one of the above exemplary embodiments may be applied to an image forming apparatus 10 that performs monochrome printing using the K color. In this case, the K color serving as the same color is an example of the first color and the second color.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
   a processor configured to
      set an image position of a reference image in a transport direction of a recording medium to an arbitrary position on a specific page of the recording medium, the reference image being formed using a first color and serving as a reference for an image position of an image of a second color to be formed after the image of the first color is formed, and
      adjust the image position for the second color on an adjacent page, located adjacently upstream of the specific page in the transport direction, by using image information of the reference image formed on the specific page.

2. The image processing apparatus according to claim 1, further comprising:
   a display that displays an image,
   wherein the processor is configured to
      cause the display to display an input screen on which the arbitrary position is settable.

3. The image processing apparatus according to claim 2, wherein the processor is configured to
   cause the display to display a position settable as the arbitrary position if a position input by operating the input screen is not settable as the arbitrary position.

4. The image processing apparatus according to claim 3, wherein the processor is configured to
   perform an image forming process by treating the reference image and a normal image as a single group, the reference image being formed on the specific page, the normal image being different from the reference image and being formed on the adjacent page by using the first color.

5. The image processing apparatus according to claim 4, further comprising:
   a first image forming unit that forms the image of the first color;
   a second image forming unit that is disposed downstream of the first image forming unit in the transport direction and that forms the image of the second color;
   a first detector that is disposed upstream of the first image forming unit in the transport direction and that detects a preliminarily-formed specific image; and
   a second detector that is disposed downstream of the first image forming unit in the transport direction and upstream of the second image forming unit in the transport direction and that detects the reference image formed by the first image forming unit, wherein the processor is configured to output an image formation command for forming the reference image on the specific page and the normal image on the adjacent page to the first image forming unit if the first detector detects the specific image, and adjust the image position of the image of the second color to be formed on the adjacent page by the second image forming unit by using the image information of the reference image if the second detector detects the reference image formed on the specific page.

6. The image processing apparatus according to claim 5, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

7. The image processing apparatus according to claim 4, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

8. The image processing apparatus according to claim 3, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

9. The image processing apparatus according to claim 2, wherein the processor is configured to perform an image forming process by treating the reference image and a normal image as a single group, the reference image being formed on the specific page, the normal image being different from the reference image and being formed on the adjacent page by using the first color.

10. The image processing apparatus according to claim 9, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output an image formation command for forming the reference image on the specific page and the normal image on the adjacent page to the first image forming unit if the first detector detects the specific image, and adjust the image position of the image of the second color to be formed on the adjacent page by the second image forming unit by using the image information of the reference image if the second detector detects the reference image formed on the specific page.

11. The image processing apparatus according to claim 10, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

12. The image processing apparatus according to claim 9, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

13. The image processing apparatus according to claim 2, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

14. The image processing apparatus according to claim 1, wherein the processor is configured to perform an image forming process by treating the reference image and a normal image as a single group, the reference image being formed on the specific page, the normal image being different from the reference image and being formed on the adjacent page by using the first color.

15. The image processing apparatus according to claim 14, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output an image formation command for forming the reference image on the specific page and the normal image on the adjacent page to the first image forming unit if the first detector detects the specific image, and adjust the image position of the image of the second color to be formed on the adjacent page by the second image forming unit by using the image information of the reference image if the second detector detects the reference image formed on the specific page.

16. The image processing apparatus according to claim 15, further comprising:

a first image forming unit that forms the image of the first color;

a second image forming unit that is disposed downstream of the first image forming unit in the transport direction and that forms the image of the second color;

a first detector that is disposed upstream of the first image forming unit in the transport direction and that detects a preliminarily-formed specific image; and a second detector that is disposed downstream of the first image forming unit in the transport direction and upstream of the second image forming unit in the transport direction and that detects the reference image formed by the first image forming unit, wherein the processor is configured to output at least an image formation command for forming the reference image on the specific page to the first image forming unit if the first detector detects the specific image, and adjust the image position of the image of the second color to be formed on the adjacent page by the second image forming unit by using the image information of the reference image and preliminarily-acquired reference information of the reference image if the second detector detects the reference image formed on the specific page.

17. The image processing apparatus according to claim 14, further comprising:
a first image forming unit that forms the image of the first color;
a second image forming unit that is disposed downstream of the first image forming unit in the transport direction and that forms the image of the second color;
a first detector that is disposed upstream of the first image forming unit in the transport direction and that detects a preliminarily-formed specific image; and
a second detector that is disposed downstream of the first image forming unit in the transport direction and upstream of the second image forming unit in the transport direction and that detects the reference image formed by the first image forming unit,
wherein the processor is configured to
output at least an image formation command for forming the reference image on the specific page to the first image forming unit if the first detector detects the specific image, and
adjust the image position of the image of the second color to be formed on the adjacent page by the second image forming unit by using the image information of the reference image and preliminarily-acquired reference information of the reference image if the second detector detects the reference image formed on the specific page.

18. The image processing apparatus according to claim 1, further comprising:
a first image forming unit that forms the image of the first color;
a second image forming unit that is disposed downstream of the first image forming unit in the transport direction and that forms the image of the second color;
a first detector that is disposed upstream of the first image forming unit in the transport direction and that detects a preliminarily-formed specific image; and
a second detector that is disposed downstream of the first image forming unit in the transport direction and upstream of the second image forming unit in the transport direction and that detects the reference image formed by the first image forming unit,
wherein the processor is configured to
output at least an image formation command for forming the reference image on the specific page to the first image forming unit if the first detector detects the specific image, and
adjust the image position of the image of the second color to be formed on the adjacent page by the second image forming unit by using the image information of the reference image and preliminarily-acquired reference information of the reference image if the second detector detects the reference image formed on the specific page.

19. A non-transitory computer readable medium storing a program causing a computer to execute a process, the process comprising:
setting an image position of a reference image in a transport direction of a recording medium to an arbitrary position on a specific page of the recording medium, the reference image being formed using a first color and serving as a reference for an image position of an image of a second color to be formed after the image of the first color is formed; and
adjusting the image position for the second color on an adjacent page, located adjacently upstream of the specific page in the transport direction, by using image information of the reference image formed on the specific page.

20. An image processing apparatus comprising processor means for:
setting an image position of a reference image in a transport direction of a recording medium to an arbitrary position on a specific page of the recording medium, the reference image being formed using a first color and serving as a reference for an image position of an image of a second color to be formed after the image of the first color is formed; and
adjusting the image position for the second color on an adjacent page, located adjacently upstream of the specific page in the transport direction, by using image information of the reference image formed on the specific page.

* * * * *